United States Patent [19]
Burton

[11] 3,931,823
[45] Jan. 13, 1976

[54] CANE SEPARATOR FOR HARVESTING MACHINE

[75] Inventor: Charles G. Burton, Lewiston, N.Y.

[73] Assignee: Chisholm-Ryder Company, Inc., Niagara Falls, N.Y.

[22] Filed: Jan. 17, 1973

[21] Appl. No.: 324,545

[52] U.S. Cl. ............................. 130/30 R; 56/330
[51] Int. Cl.² ...................................... A01D 46/00
[58] Field of Search ...... 198/20, 185; 130/5 G, 5 D, 130/5 C, 30 R, 30 P, 31 R; 56/330

[56] References Cited
UNITED STATES PATENTS

| | | | |
|---|---|---|---|
| 2,664,580 | 1/1954 | Feeser | 130/5 G |
| 3,166,181 | 1/1965 | Rutkus | 198/185 |

FOREIGN PATENTS OR APPLICATIONS

| | | | |
|---|---|---|---|
| 1,150,917 | 6/1963 | Germany | 198/20 |
| 489,627 | 12/1930 | Germany | 198/20 |

Primary Examiner—Evon C. Blunk
Assistant Examiner—Jeffrey V. Nase
Attorney, Agent, or Firm—Joseph P. Gastel

[57] ABSTRACT

A cane separator for removing cane from the intersection of first and second conveyors of a harvesting machine, including a toothed chain mounted in the path of travel of the first conveyor for guiding cane leaving said first conveyor across said second conveyor, a rotating shaft for driving said toothed chain, said shaft being located on the opposite side of said second conveyor from said first conveyor for engaging cane which may extend beyond said second conveyor and thus pulling cane from said second conveyor, and a wobble wheel keyed to said shaft and extending transversely to the path of travel of said second conveyor to engage cane and lift it from said second conveyor.

9 Claims, 5 Drawing Figures

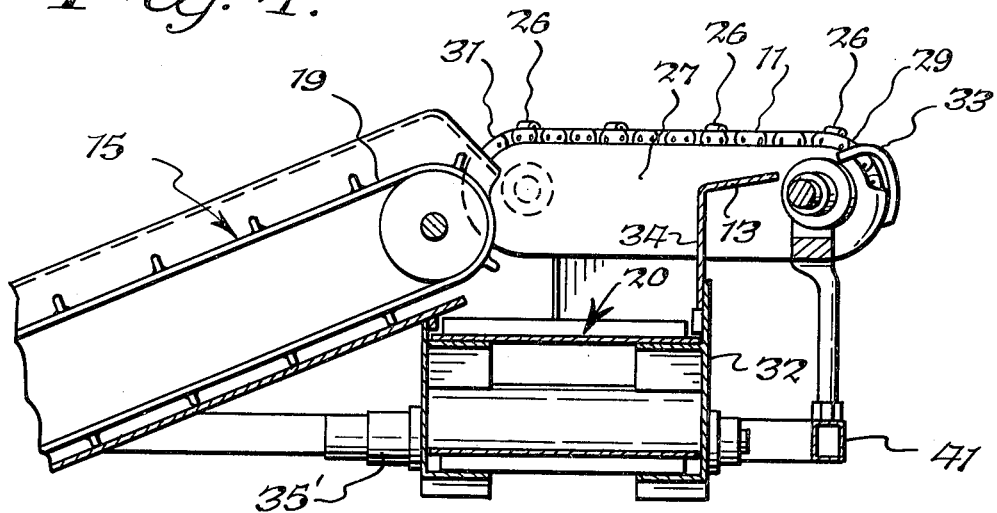
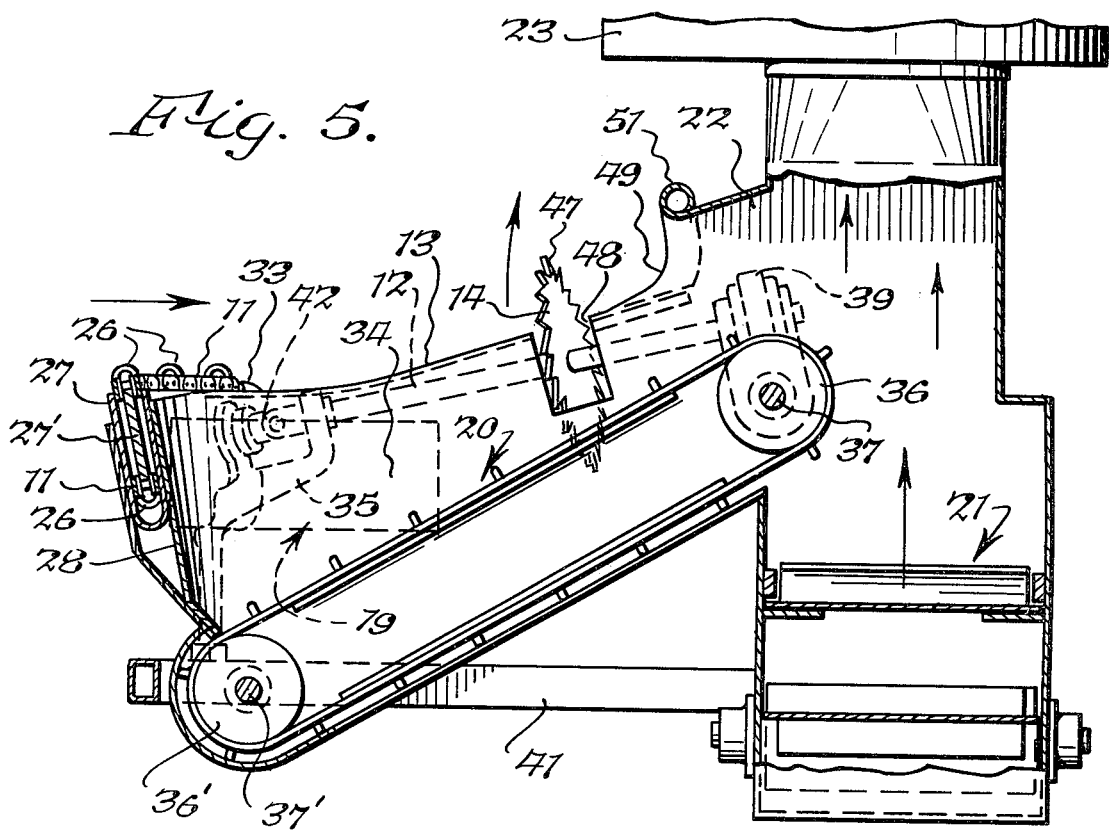

CANE SEPARATOR FOR HARVESTING MACHINE

The present invention relates to a device for removing undesired cane from the conveyors of a harvesting machine.

By way of background, in certain types of harvesting machines, such as grape harvesters, conveyors are located in intersecting relationship to each other. These conveyors not only carry the harvested fruit, but also carry debris such as cane and leaves which were removed from the plants during the harvesting operation. In the past, long pieces of cane could not negotiate the intersection of the conveyors and became stuck at the intersection. This, in turn caused the remainder of the material carried by the conveyors to become jammed at the intersection. The various remedies for such jamming were inefficient and uneconomical. One remedy was to utilize extra personnel who walked behind the harvesting machine and cleared the jams manually. Another remedy was for the operator of the harvester to periodically stop the harvester and remove the jammed material. With both of the foregoing remedies extra labor was required and in addition there was a waste of fruit which was discarded along with the cane and leaves. It is with overcoming the foregoing deficiencies of prior harvesters that the present invention is concerned.

It is accordingly the primary object of the present invention to provide a cane separator for use at the junction of two intersecting conveyors which efficiently removes cane from this intersection so as to prevent jamming. A related object of the present invention is to provide a cane separator which operates efficiently so as to obviate the necessity for any manual labor for removing the cane which may cause jamming. A further related object of the present invention is to provide a cane separator for the junction of two intersecting conveyors of a harvesting machine which will remove the cane but leave the fruit so as not to waste such fruit. Other objects and attendant advantages of the present invention will readily be perceived hereafter.

The cane separator of the present invention is associated with a harvesting machine having a first conveyor having a first path of travel and a second conveyor having a second path of travel extending in intersecting relationship to said first path of travel, said cane separator comprising cane engaging means located beyond said first conveyor and above said second conveyor and positioned in said first path of travel and driving means for driving said cane engaging means to direct cane leaving said first conveyor across said second conveyor.

The cane separator also includes second cane engaging means mounted alongside said second conveyor on the opposite side thereof from said first conveyor for engaging cane extending beyond said second conveyor and removing said cane therefrom. In addition, the cane separator includes third cane engaging means mounted transversely to said second path of travel of said second conveyor for engaging cane passing along said second conveyor and removing it therefrom. The various aspects of the present invention will be more fully understood when the following portions of the specification are read in conjunction with the accompanying drawings wherein:

FIG. 4 is a fragmentary cross sectional view taken substantially along line 4—4 of FIG. 3; and FIG. 5 is a fragmentary cross sectional view taken substantially along line 5—5 of FIG. 3.

Figure 1:
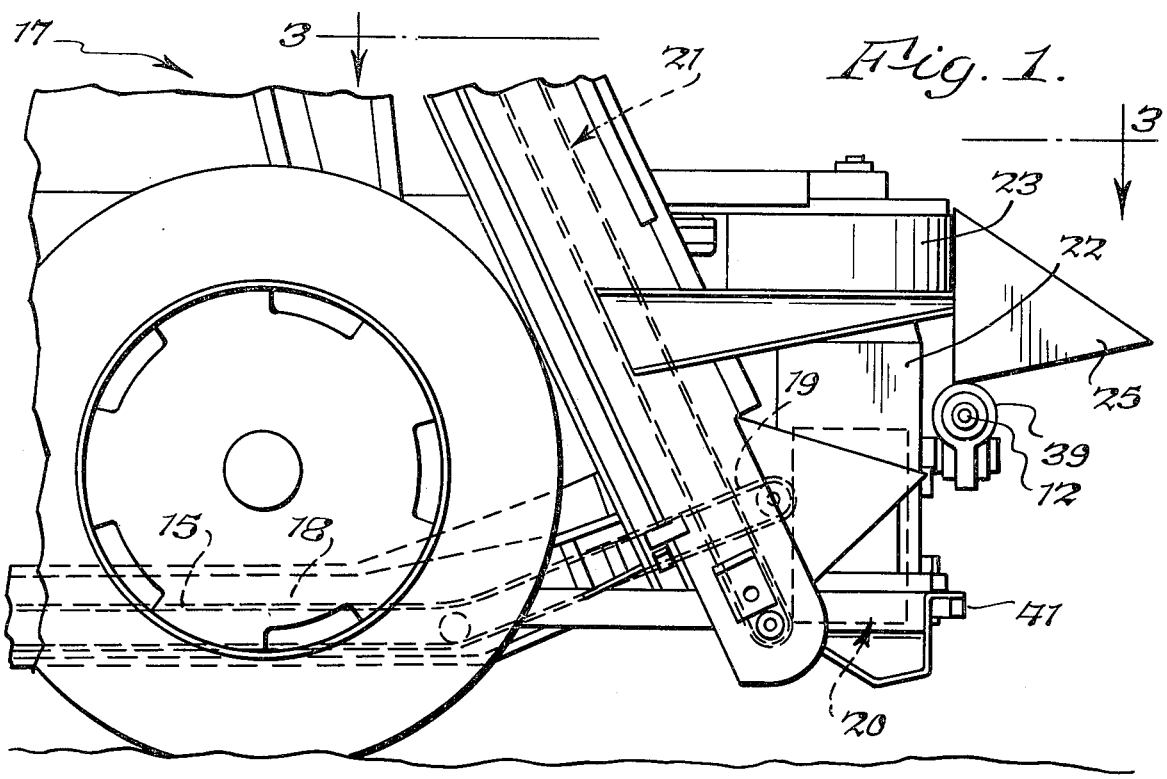
FIG. 1 is a fragmentary side elevation view of the rear end of a grape harvester.

By way of brief preview, the cane separator 10 of the present invention essentially includes a toothed endless chain 11, a rotating shaft 12 mounted proximate slide plate 13, and a toothed wheel 14 keyed to shaft 12 and mounted obliquely thereto to provide a wobble effect.

The cane separator 10 is shown as being mounted proximate the junction of the collecting conveyor 15 and the first elevator conveyor of a grape harvester. Conveyor 15 receives grapes and debris, such as cane and leaves, from flexible shutter-like leaves 16 on which these items drop as a result of being shaken from the grapevines by suitable shaker mechanism (not shown) mounted on harvesting machine 17. Briefly by way of background, the harvesting machine 17 travels along the rows of grapevines and the leaves or shutters 16 and 16' of the machine yield and separate away from their junction 17' as they encounter the grapevine trunks and the posts which support the grapevines. However, leaves 16 and 16' normally occupy a closed position shown in FIG. 2 wherein they provide a continuous surface for receiving material shaken from the plants, and such material moves from leaves 16 onto conveyor 15. While the ensuing description is directed to a grape harvester, it will be appreciated that the cane separator can be used equally well in a harvester for other types of plants where cane or branches may cause jamming.

The material received by conveyor 15 travels along the horizontal run 18 thereof and thereafter travels upwardly along the inclined portion 19 at the end thereof and thereafter drops onto the first elevating conveyor 20 which carries it to second elevating conveyor 21 which lifts it to a sufficient elevation to permit it to be loaded into suitable containers by suitable mechanism not shown. The material received by conveyor 15 comprises bunches of grapes, single grapes, leaves, long cane up to 6 feet long, short cane as short as a few inches long, and cane having leaves and bunches of grapes attached. The cane may be of a diameter of approximately one-fourth to one-half inch. The foregoing materials may be carried by conveyor 15 to a depth of up to 5 inches, considering that the grape harvester 17 travels along the rows of grapevines at a speed of up to four miles per hour and the conveyor 15 carries up to ten tons of grapes per hour, in addition to the debris consisting of leaves and canes. At this point it is to be noted that there is another conveyor (not shown) such as 15 and parallel to and located to the right of conveyor 15 adjacent leaves or shutters 16', so that the machine can actually harvest up to 20 tons of grapes per hour.

As a result of the large mass of material being transferred from conveyor 15 onto conveyor 20, which is oriented substantially perpendicularly to conveyor 15, in the past there was a tendency for frequent jamming to occur proximate the junction of conveyors 15 and 20, primarily because long pieces of cane could not negotiate the right angle turn between conveyors 15 and 20 and became stuck there. This in turn caused the remainder of the materials including the leaves, grapes, and short pieces of cane to form a jam at the intersection. The jamming was further compounded by the fact that conveyor 20 passed into the relatively narrow entrance of duct 22 leading to fan housing 23. In this respect, if more than a certain amount of material accumulated on conveyor 20 at the entrance of duct 22, this narrow entrance became clogged, and this resulted in total jamming. Duct 22 is necessary to limit the air flow above conveyor 20 leading to fan 24 which sucks leaves and other debris upwardly from the mass of grapes falling from first elevator conveyor 20 onto second elevator conveyor 21 and blows such debris out of chute 25 so as to cause it to drop on the ground behind the machine 17.

The jamming at the junction of conveyors 15 and 20 occured primarily in areas where grapevines characteristically had heavy lush growth because the harvesting mechanism in stripping the grapes from the vines also broke off a large amount of cane and leaves which caused the jamming. As a result of such jamming, the expense of harvesting increased greatly because a number of expensive remedies were previously employed before the separator 10 of the present invention was devised. These remedies included having two men walk behind the machine, one man at the junction of each set of conveyors 15 and 20 and these men reached into the conveyors to remove cane and other debris, as necessary. Many times this procedure was wasteful in that the men discarded cane with bunches of grapes thereon. Another remedy was to stop the machine frequently as jamming occurred and the driver of the machine had to get off of his perch, approximately twelve feet above the ground, and unclog the machine by hand which frequently took ten minutes for both sides. Not only did the rate of harvesting decrease because of the necessity of stopping the machine, but in addition there was waste because as the space above conveyor 20 filled up with cane, leaves and grapes, grapes leaving conveyor 15 were guided over conveyor 20 and dropped onto the ground and were wasted. Thus prior remedies to overcome jamming were wasteful of both labor and harvested fruit.

The cane separator 10 of the present invention eliminates jamming at the junction of the conveyors 15 and 20 by cane and therefore overcomes the above discussed shortcomings. More specifically, cane separator 10 includes an endless chain 11 having teeth 26 spacedly mounted thereon, chain 11 running about plate 27' located within housing 27. Teeth 26 are shown as being of inverted U-shaped configuration but they may be more in the shape of an inverted V if desired. Chain 11 is mounted on housing 17 secured, as by welding, to wall 28 of the machine. A sprocket 29 within housing 27 drives chain 11 in the direction of arrow 30, chain 11 passing around sprocket 29 and idler sprocket 31. Long pieces of cane following the path of travel of collecting conveyor 15 and being engaged by teeth 26 of chain 11 will be carried rearwardly beyond rear wall 32 of conveyor 20 and will be dropped to the rear of machine 17. A stripper mechanism consisting of spaced fingers 33 is secured to housing 27, as by welding, and tends to prevent undesired debris from passing into housing 27 along with chain 11. It will be appreciated that any clumps of grapes on the cane which is engaged by chain 11 will drop down onto first elevating conveyor 20 as chain 11 moves the cane rearwardly and these grapes will tend to be detached from the cane because the conveyor will tend to move the clumps of grapes in a first direction while chain 11 tends to move the cane in another direction. Chain 11, which pulls cane rearwardly will also cause certain clumps of grapes thereon to be moved against the vertical wall 34 which supports upwardly inclined slide plate 13 at its upper end, thereby pressing the clumps of grapes against vertical wall 34 so as to cause them to be stripped therefrom.

Conveyor 20 is driven by motor 35' coupled to shaft 37' which mounts roller 36'. Sprocket 29, which drives chain 11, is driven from idler roller 36 on which the conveyor belt of conveyor 20 is mounted. In this respect, roller 36 drives shaft 37 which drives shaft extension 38 which is coupled to right angle gear box 39 which drives shaft 12 which is coupled to sprocket 29 through universal 42 supported above frame 41 by bracket 35. It will readily be appreciated that shaft 12 and chain 11 will be driven at a speed which is proportional to the speed of travel of conveyor 20 to thereby provide automatic synchronization of these elements with the speed of the conveyor.

Figure 2:
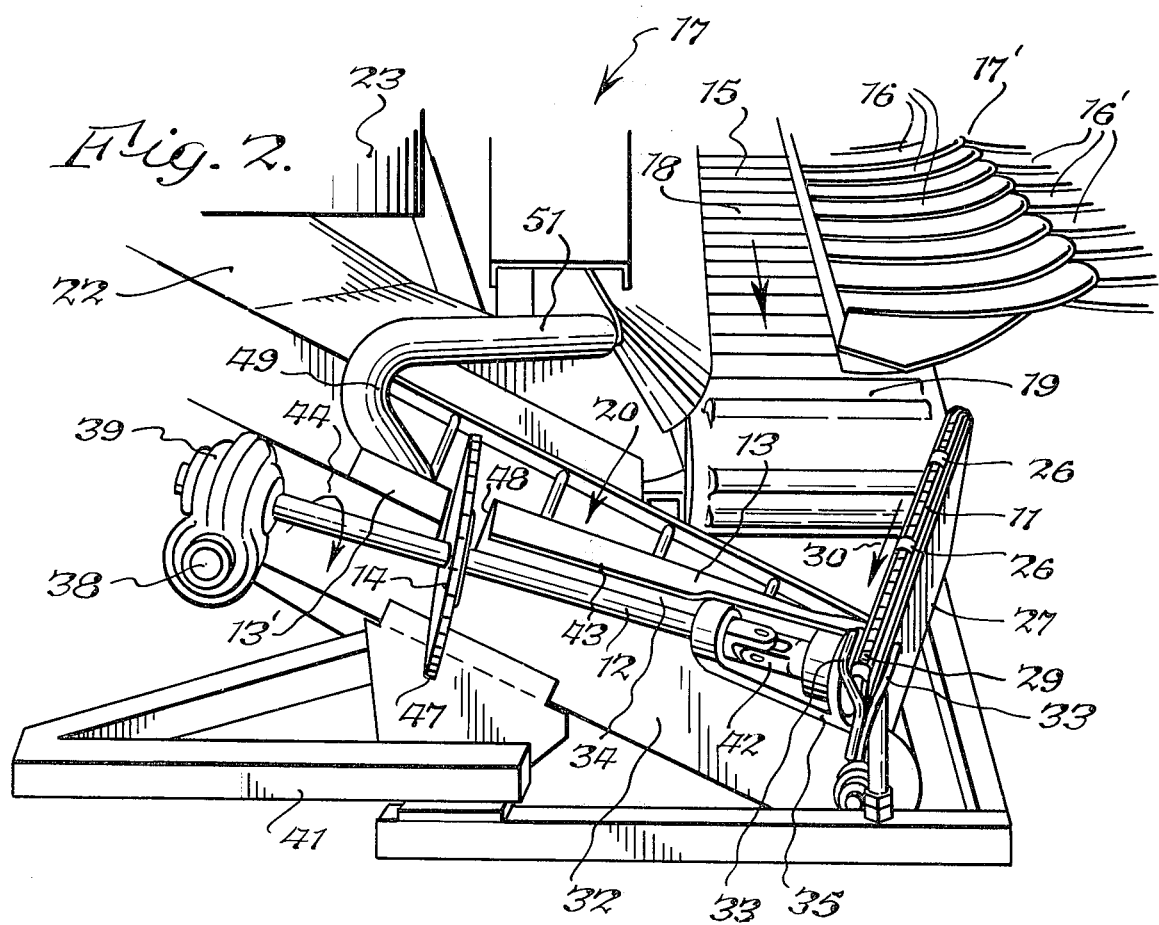
FIG. 2 is a fragmentary perspective view, taken from the right of FIG. 1, of the cane separator structure mounted on the grape harvester.

As can be seen from FIGS. 2 and 4, shaft 12 is positioned adjacent the trailing edge 43 of slide plate 13. Shaft 12 rotates in the direction of arrow 44 and the surface of shaft 12 is preferably roughened, as by slight knurling, so that it can frictionally engage cane and leaves extending beyond conveyor 20 and pressing downwardly on shaft 12 so as to work the cane rearwardly across slide plate 13. This working is a gradual process which maintains a rearward force on the cane so that clumps of grapes hanging downwardly along wall 34 will tend to be stripped therefrom. Chain 11 and shaft 12 thus work on cane which extends sufficiently above first elevating conveyor 20 so as to be engaged by these portions of the separator.

However, it will be appreciated that the ends of some long pieces of cane may drop downwardly so as to abut walls 28 or 34. Such pieces of cane cannot be acted on by chain 11 or shaft 12. These pieces of cane will tend to be carried upwardly with conveyor 20 in the direction of arrow 46 (FIG. 3) until such time as they are engaged by toothed wobble wheel or disc 14 which is mounted at an angle of approximately 10 degrees to the axis of shaft 12. It is to be noted that teeth 47 of wheel 14 point forwardly so that they will not dig into anything they engage but will tend to slide out under such subject matter, thereby applying a gentle gripping action to the cane and the leaves but not a hooking engagement therewith. However, if a more aggressive engagement with the cane is desired, wheel 14 may be reversed. Since one side of wheel 14 intersects wall 34 through slot 48 in said wall, any cane, leaves or other debris moved upwardly along wall 34 by conveyor 20 will be engaged by the outer periphery of toothed wobble wheel 14 and carried upwardly along wall 34 and over slide plate 13. Wheel 14 wobbles back and forth in slot 48, and this wobbling motion produces a self-cleaning action of slot 48. It is to be noted that there is a rounded junction 34' between walls 28 and 34 so as to guide the ends of the cane from wall 28 upwardly along wall 34.

Figure 3:
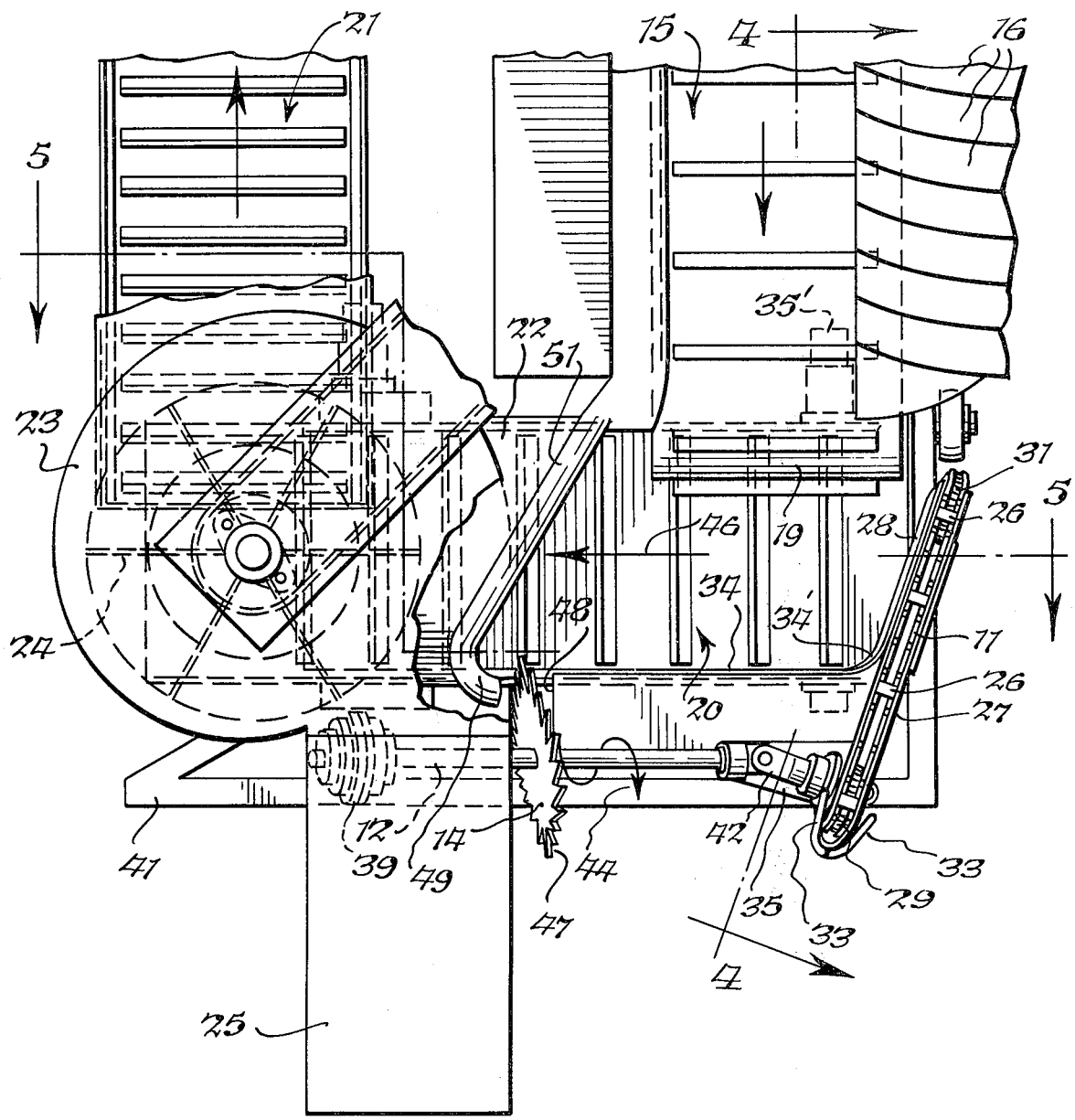
FIG. 3 is a fragmentary plan view taken substantially in the direction of line 3—3 of FIG. 1, and showing the various components of the cane separator in relation to the conveyors.

At this point it is to be noted that slide plate 13 includes a short extension 13' on the opposite side of wheel 14 from main slide plate section 13. The entrance end of duct 22 has a rolled edge 51 to eliminate any sharp edges or a sharp corner at 49 which could act as a focal point for the accumulation of debris. It is further to be noted that the upper edge 51 of duct 22 is inclined as shown in FIG. 3 relative to the direction of travel of conveyor 20 so as to further minimize the tendency for cane or leaves to get caught in duct 22. In other words, all of the long cane should have been eliminated by the cane separator prior to the time that it reaches duct 22.

By way of further illustration and not of limitation, shaft 12 is approximately ¾ inches in diameter and it rotates at a speed of approximately 200 revolutions per minute. Wobble wheel 14 is approximately 9 inches in diameter and chain 11 travels at a linear speed of approximately 130 feet per minute as a result of sprocket 29 being 2.5 inches in diameter.

It can thus be seen that the cane separator of the present invention is manifestly capable of achieving the above enumerated objects. It will further be appreciated that while the cane separator has been described with respect to the harvesting of grapes, it can be used with equal advantage on harvesters having intersecting runs of conveyors which are used for harvesting other types of berries and fruits which are separated from plants by means of a shaking action which causes cane and leaves to be removed from the plant along with the fruit.

While a preferred embodiment of the present invention has been disclosed it will be appreciated that the present invention is not limited thereto but may be otherwise embodied within the scope of the following claims.

What is claimed is:

1. A cane separator for a grape harvesting machine comprising a first conveyor for receiving harvested material including grapes and cane, said first conveyor having first and second opposite sides, a second conveyor oriented transversely to said first conveyor to provide a junction therewith, said second conveyor having third and fourth opposite sides, said first conveyor terminating proximate said third side and being above said second conveyor at said junction so as to cause said second conveyor to receive grapes dropped on it from said first conveyor, and cane removing means positioned beyond said junction and above said second conveyor for engaging and removing cane which passes beyond said junction, said cane removing means including first and second cane engaging means, said first cane engaging means being located proximate said fourth side, and said second cane engaging means extending across said second conveyor and being oriented substantially lengthwise of said second side, said second side being located upstream of said first side in relation to the direction of movement of said second conveyor, and driving means for driving said cane engaging means.

2. A cane separator for a harvesting machine as set forth in claim 1 wherein said second cane-engaging means is oriented in intersecting relationship with an extension of said second side, and wherein said driving means drives said second cane-engaging means in generally the same direction as said direction of movement of said first conveyor.

3. A cane separator for a harvesting machine as set forth in claim 1 wherein said second cane-engaging means comprises an endless chain having spaced teeth thereon.

4. A cane separator for a grape harvesting machine having a first conveyor with a first path of travel for receiving grapes and cane and a second conveyor defining a junction with said first conveyor and having a second path of travel extending in intersecting relationship to said first path of travel to receive grapes from first conveyor at said junction comprising cane removing means for removing cane from said junction, said cane removing means including a first cane-engaging means located beyond said junction and beyond said first conveyor and above said second conveyor and positioned across an extension of said first path of travel for removing cane which engages said cane-engaging means from the area of said junction, driving means for driving said first cane-engaging means, said cane removing means including a second cane-engaging means mounted alongside of said second conveyor on the opposite side thereof from said first conveyor for engaging cane extending beyond said second conveyor and removing said cane therefrom, said second cane-engaging means comprising an elongated shaft located lengthwise of said second conveyor, and means for rotating said elongated shaft.

5. A cane separator for a harvesting machine as set forth in claim 4 including a slide plate interposed between said second conveyor and said rotating shaft for guiding said cane to said rotating shaft.

6. A cane separator for a grape harvesting machine having a first conveyor with a first path of travel for receiving grapes and cane and a second conveyor defining a junction with said first conveyor and having a second path of travel extending in intersecting relationship to said first path of travel to receive grapes from said first conveyor at said junction comprising cane removing means for removing cane from said junction, said cane removing means including a first cane-engaging means located beyond said junction and beyond said first conveyor and above said second conveyor and positioned across an extension of said first path of travel for removing cane which engages said cane-engaging means from the area of said junction, driving means for driving said first cane-engaging means, said cane removing means including a second cane-engaging means mounted alongside of said second conveyor on the opposite side thereof from said first conveyor for engaging cane extending beyond said second conveyor and removing said cane therefrom, said cane removing means including a third cane-engaging means mounted in intersecting relationship with said second path of travel of said second conveyor for engaging cane passing along said second conveyor and removing it therefrom.

7. A cane separator for a harvesting machine as set forth in claim 6 wherein said third cane-engaging means comprises a toothed wheel mounted proximate said slide plate.

8. A cane separator for a harvesting machine as set forth in claim 7 wherein said toothed wheel is mounted on said rotating shaft.

9. A cane separator for a harvesting machine as set forth in claim 8 wherein said toothed wheel is mounted oblique to said rotating shaft to create a wobble motion, and a widened slot in said slide plate through which said toothed wheel extends.

* * * * *